US008745773B2

(12) United States Patent
Moon

(10) Patent No.: US 8,745,773 B2
(45) Date of Patent: Jun. 10, 2014

(54) TOILET STOOL USING CYCLONE TYPE SEWAGE PURIFIER

(76) Inventor: Sang-Hoon Moon, Bupyeong-Gu (KR)

(*) Notice: Subject to any disclaimer, the term of this patent is extended or adjusted under 35 U.S.C. 154(b) by 0 days.

(21) Appl. No.: 13/404,560

(22) Filed: Feb. 24, 2012

(65) Prior Publication Data

US 2012/0240323 A1 Sep. 27, 2012

Related U.S. Application Data

(63) Continuation of application No. 12/438,177, filed as application No. PCT/KR2007/004161 on Aug. 29, 2007, now abandoned.

(30) Foreign Application Priority Data

Sep. 1, 2006 (KR) .............................. 10-2006-84081

(51) Int. Cl.
*E03D 11/02* (2006.01)
*E03D 9/10* (2006.01)
*C02F 3/14* (2006.01)

(52) U.S. Cl.
USPC .................... 4/431; 4/319; 4/442; 210/195.1; 210/512.1; 210/806

(58) Field of Classification Search
USPC ...................... 4/441–446, 481, 431–433, 300, 4/318–320; 210/787, 806, 173–174, 210/195.1, 512, 512.1, 512.3
See application file for complete search history.

(56) References Cited

U.S. PATENT DOCUMENTS

| 1,303,358 | A | * | 5/1919 | Montgomery | .................... | 4/317 |
| 2,472,457 | A | * | 6/1949 | Ash | ................................. | 4/300 |
| 3,587,116 | A | * | 6/1971 | Quase | ............................... | 4/300 |
| 3,798,681 | A | * | 3/1974 | Johansen | ......................... | 4/440 |
| 3,843,976 | A | * | 10/1974 | Miya et al. | ....................... | 4/300 |
| 4,142,261 | A | * | 3/1979 | Johansen | ......................... | 4/300 |
| 4,155,129 | A | * | 5/1979 | Russell | ............................. | 4/429 |
| 4,501,665 | A | * | 2/1985 | Wilhelmson | .................. | 210/630 |
| 5,068,926 | A | * | 12/1991 | Suzuki | .............................. | 4/318 |
| 5,725,762 | A | * | 3/1998 | Beal et al. | ...................... | 210/181 |
| 6,258,594 | B1 | * | 7/2001 | Nakaya | ....................... | 435/290.1 |
| 2006/0143815 | A1 | * | 7/2006 | Peres | ................................. | 4/442 |
| 2007/0011801 | A1 | * | 1/2007 | DuBois | ............................ | 4/442 |

FOREIGN PATENT DOCUMENTS

| JP | 07-91854 | B2 | | 10/1995 | | |
| JP | 10110444 | A | * | 4/1998 | ............. | E02D 29/12 |
| JP | 2000-184988 | A | | 7/2000 | | |
| JP | 2000184988 | A | * | 7/2000 | ............. | A47K 11/02 |

(Continued)

*Primary Examiner* — Winnie Yip
(74) *Attorney, Agent, or Firm* — Edwards Wildman Palmer LLP; Kongsik Kim

(57) ABSTRACT

The present invention provides a toilet using a cyclone-type sewage purifier, which can discharge excrement using a small amount of water and can sanitarily treat the discharged excrement using waste water, thus increasing the efficiency with which the waste water is recycled. The toilet includes a toilet bowl having a depression; a refuse pipe passing through the toilet bowl and connected to the depression, thus guiding the discharge of excrement from the depression; a refuse bowl seated in the depression and temporarily holding the excrement, and discharging the excrement into the refuse pipe when it is rotated; a rotating device for rotating the refuse bowl; and a cyclone-type sewage purifier for executing purification treatment using a vortex generated by descent of the excrement and waste water discharged from the refuse pipe and a waste water pipe.

17 Claims, 9 Drawing Sheets

(56) References Cited

FOREIGN PATENT DOCUMENTS

| JP | 2003268852 A | * | 9/2003 | ............ E03D 11/11 |
| KR | 20-1999-0035020 U | | 9/1999 | |
| KR | 20-0220359 Y1 | | 2/2001 | |

* cited by examiner (a)  (b)

TOILET STOOL USING CYCLONE TYPE SEWAGE PURIFIER

CROSS REFERENCE TO RELATED APPLICATIONS

The application is a continuation application of application Ser. No. 12/438,177 which is a U.S. national phase of International Application No. PCT/KR2007/004161 filed on Aug. 29, 2007, which claims the benefit of Korean Application No. 10-2006-0084081 filed on Sep. 1, 2006, which applications are incorporated herein be reference.

BACKGROUND (a) Technical Field

The present invention relates, in general, to a toilet using a cyclone-type sewage purifier and, more particularly, to a toilet using a cyclone-type sewage purifier, which can discharge excrement using a small amount of water, thus reducing the amount of water to be used for flushing the toilet, and which can purifies the discharged excrement using waste water.

(b) Background Art

Generally, as shown in FIG. 1, a conventional toilet 110 comprises a toilet bowl having a depression for holding excrement during defecation and urination. A refuse pipe 120 extends from the toilet 110 and discharges the excrement from the depression to the outside of the toilet. Here, the partitioning wall between the depression and the refuse pipe 120 is configured to be higher than a predetermined level, so that a predetermined amount of water can always be contained in the depression, thereby preventing the excrement from being stuck to the depression and preventing the emission of odor.

After defecation and urination, the user manipulates a flush handle of a toilet tank, so that a predetermined amount of water strongly flows from the toilet tank to the toilet bowl, thus flushing the toilet bowl with water. In the above state, the water and excrement held in the depression are discharged to the outside of the toilet through the refuse pipe 120, and thereafter, new fresh water is contained in the depression. Thus, the toilet may be kept in a clean and sanitary condition.

However, the above-mentioned conventional toilet 110 is problematic in that, to discharge excrement and prevent the emission of odors, a large amount of water must be supplied from the toilet tank to the toilet bowl. Described in detail, to discharge the excrement and keep the toilet bowl clean every time the conventional toilet 110 is used, about 13 l or 14 l of water must be contained in the depression, so that the conventional toilet undesirably wastes a large amount of water resources.

Further, the toilets 110 installed in respective houses are connected through the refuse pipes 120 to an excrement treatment tank 130, which is installed under the ground line (GL) and is provided with an eduction pipe 131, by which excrement is discharged from the toilets 110 to the excrement treatment tank 130. Meanwhile, waste water generated from washing, bathing and cleaning in the respective houses is discharged to a waste water tank 150, which is installed under the ground line, through waste water pipes 140, which are installed separately from the refuse pipes 120. The separate installation of the refuse pipes 120 and the waste water pipes 140 is problematic in that it increases the cost and prevents the waste water from being appropriately reused.

According to statistical waterworks data from 2004, reported by the Ministry of Environment, Republic of Korea, in December, 2005, the ratio of the amount of domestic waste water to total water consumption in Korea reached 26.4% and the ratio of the amount of domestic and office waste water to the total water consumption reached about 34%. Thus, the above-mentioned problem with the conventional toilet is becoming worse.

SUMMARY OF THE DISCLOSURE

Accordingly, the present invention has been made keeping in mind the above problems occurring in the prior art, and provides a toilet using a cyclone-type sewage purifier, which can discharge excrement using a small amount of water and can sanitarily treat the discharged excrement using waste water, thus increasing the efficiency with which the waste water is recycled.

In an aspect, the present invention provides a toilet using a cyclone-type sewage purifier, comprising: a toilet bowl including a depression defining a space having a predetermined shape; a refuse pipe provided in the toilet bowl such that the refuse pipe passes through the toilet bowl and is connected at a first end thereof to the depression, thus guiding the discharge of excrement from the depression to the outside of the toilet bowl; a refuse bowl seated in the depression and temporarily holding the excrement during defecation and urination, and discharging the excrement into the refuse pipe when the refuse bowl is rotated; a rotating device for rotating the refuse bowl and discharging the excrement from the refuse bowl into the refuse pipe; and a cyclone-type sewage purifier for executing purification treatment using a vortex generated by the descent of the excrement and waste water, discharged from the refuse pipe, extending from the toilet, and from a waste water pipe for the waste water, respectively.

The toilet may further comprise: a toilet tank connected to the refuse bowl through a water supply pipe so as to supply water to the refuse bowl.

Further, the refuse bowl may have a rounded bottom bowl shape having a lip.

Further, the first end of the refuse pipe connected to the depression may have a flaring shape.

Further, the refuse bowl may be made of stainless steel and may have a coating on a surface thereof so as to prevent the excrement from sticking thereto.

Further, the toilet bowl may be provided with a bidet device.

The cyclone-type sewage purifier may comprise: a housing having an outlet port in a lower portion thereof at a predetermined location and discharging the treated excrement and waste water to the outside through the outlet port; and a cyclone tub placed inside the housing and generating the vortex using the descending excrement and waste water.

Further, the toilet may be a flushing toilet.

Further, the refuse pipe for discharging the excrement and the waste water pipe for discharging the waste water may be connected to a single integration pipe such that the excrement and the waste water can be mixed together and discharged to the cyclone tub through the integration pipe.

Further, the housing may have a tapered cup shape an upper end of which has a diameter larger than that of a lower end.

Further, the cyclone tub may be provided with a shock absorbing plate on the bottom thereof for absorbing shocks from the descending excrement and waste water.

Further, the cyclone tub may be provided with a plurality of perforations in a sidewall thereof.

Further, the cyclone tub may be provided therein with a crushing fan for crushing the descending excrement.

Further, the crushing fan may be provided with a plurality of vortex holes in each blade thereof.

Here, each of the vortex holes formed in the crushing fan may have a surface area smaller than that of each of the perforations formed in the sidewall of the cyclone tub.

According to the toilet using the cyclone-type sewage purifier of the present invention, it is possible to discharge excrement using a rotating refuse bowl, thus saving water during defecation and urination.

Further, the present invention includes an integration pipe, to which the refuse pipes and the waste water pipes are joined, and discharges the excrement and the waste water at the same time, thus reducing the installation cost of the pipes. Further, a cyclone tub is installed at a location below the integration pipe, so that it is possible to dissolve the excrement using the waste water, thereby efficiently recycling the waste water and sanitarily treating the excrement using the waste water.

By using the waste water for treating the excrement, the present invention develops alternative energy and allows about 34% of the total water consumption, which has been discarded as waste water, to be used as industrial water, thus increasing factory operating efficiency and increasing national competitiveness. Further, the present invention can reduce the consumption of water, thus securing emergency water, eliminating an embarrassing problem of national water shortage, preventing natural disasters, and providing effects expected from the obviation of construction of new dams.

DETAILED DESCRIPTION OF THE DISCLOSURE

Hereinbelow, preferred embodiments of the toilet using a cyclone-type sewage purifier according to the present invention will be described in detail with reference to the accompanying drawings.

Figure 1:
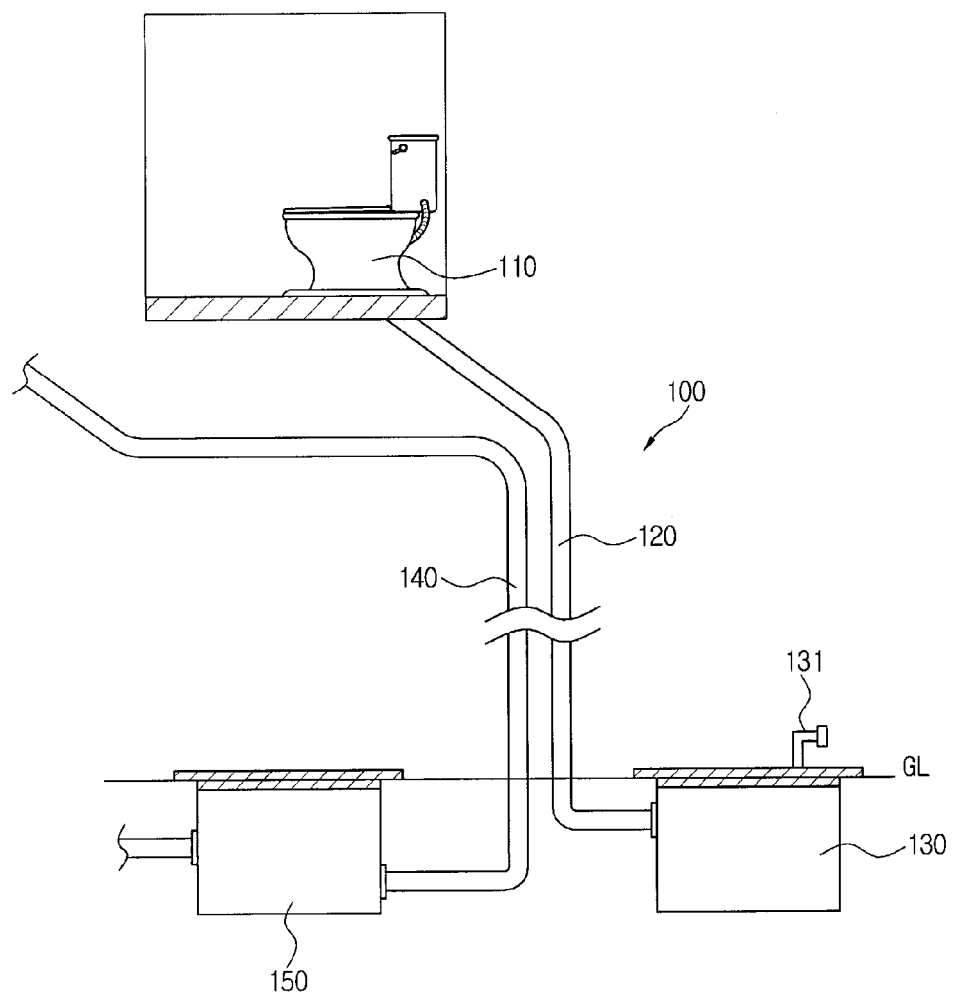
FIG. 1 is a view illustrating the construction of a toilet and a sewage purifier for the toilet according to the prior art.
Figure 2:
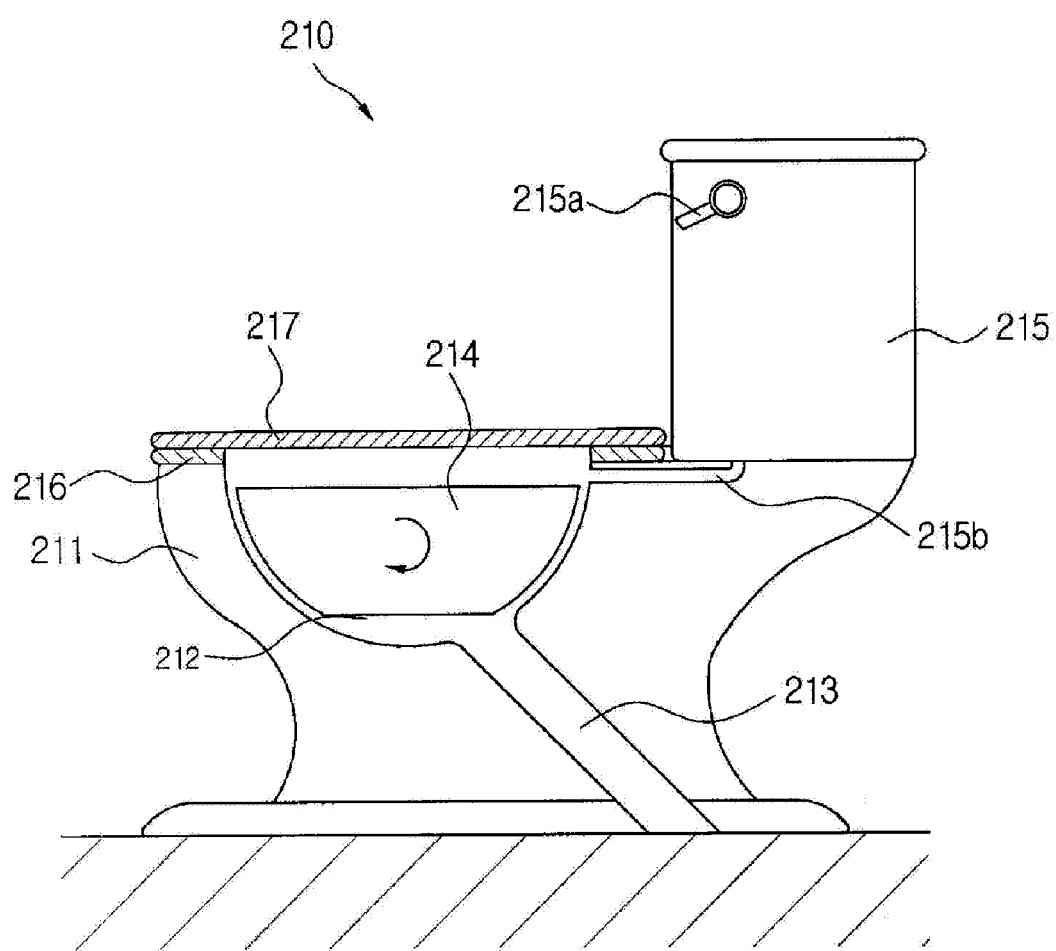
FIG. 2 is a side sectional view illustrating the construction of a toilet according to the present invention.
Figure 3:
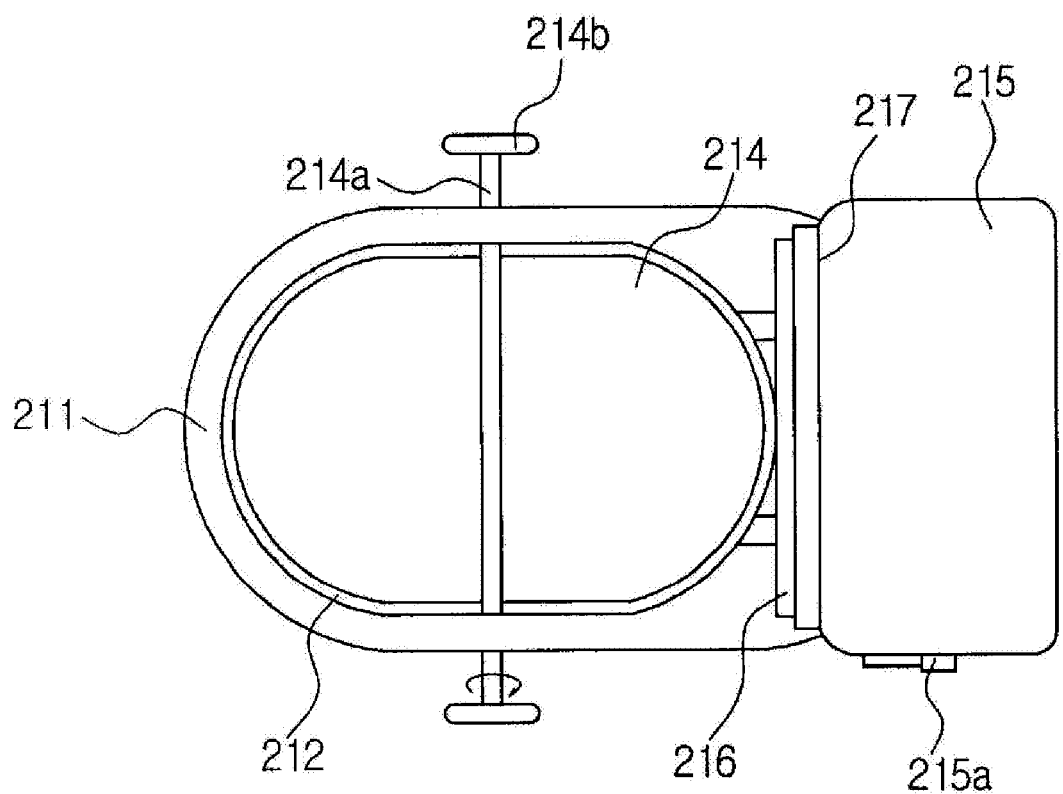
FIG. 3 is a plan view illustrating the toilet according to the present invention.
Figure 4:
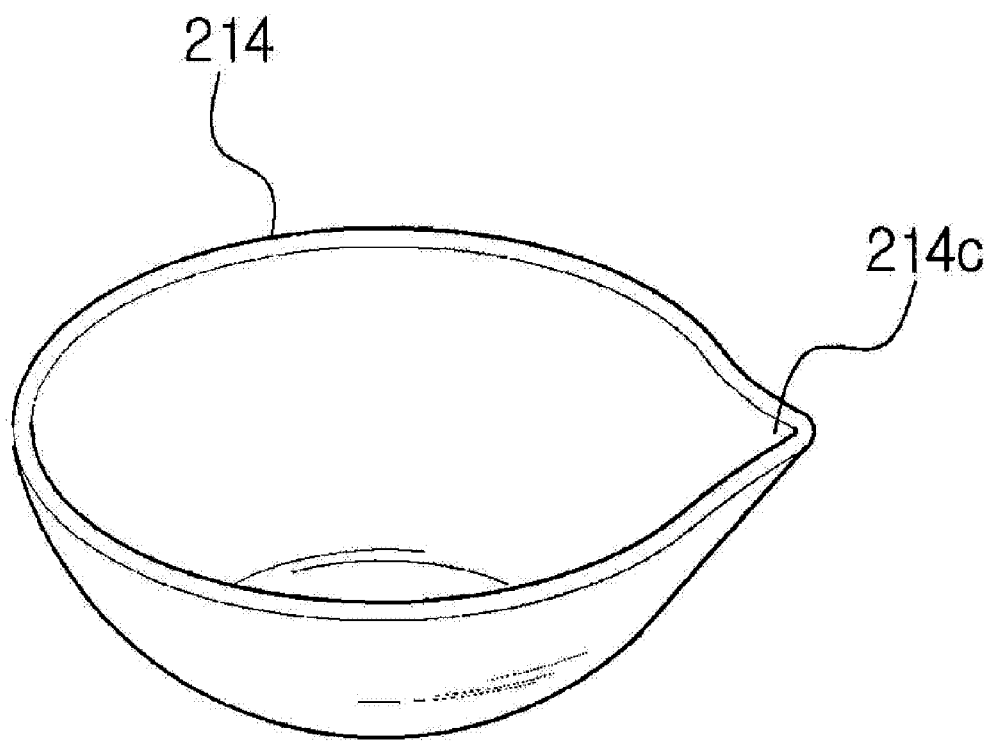
FIG. 4 is a perspective view illustrating a refuse bowl of the toilet according to the present invention.

FIG. 2 is a side sectional view illustrating the construction of a toilet according to the present invention. FIG. 3 is a plan view illustrating the toilet according to the present invention. FIG. 4 is a perspective view illustrating a refuse bowl of the toilet according to the present invention.

As shown in the drawings, the toilet 210 according to the present invention comprises a toilet bowl 211, which has a depression 212 defining a space in the toilet bowl 211, with a refuse bowl 214 seated therein. The toilet 210 further comprises a refuse pipe 213 for guiding excrement to the outside of the toilet bowl 211, the refuse bowl 214 seated in the depression 212 so as to hold excrement therein during defecation and urination and drop the excrement into the refuse pipe 213 after the defecation and urination, and a toilet tank 215 for supplying water to the refuse bowl 214.

Described in detail, the toilet bowl 211 is provided with a depression 212, for example, a hemispherical depression, to receive therein a refuse bowl 214 for holding excrement therein during defecation or urination. A discharge port is provided at a predetermined location of the bottom of the depression 212 for discharging excrement to the outside of the toilet 210. Further, in a conventional manner, an openable seat 216 is mounted using hinges to the top of the toilet bowl 211 so that a user can sit thereon during defecation and/or urination. A seat cover 217 is mounted using a hinge to an end of the seat 216.

The refuse pipe 213 is formed in the toilet bowl 211 such that it passes through the toilet bowl 211 and is connected at the inlet end thereof to the discharge port of the depression 212, and thus guides the excrement, which has been held in the refuse bowl 214, to the outside of the toilet bowl 211. It is preferred that the inlet end of the refuse pipe 213 be configured to have a flaring shape suitable for easily receiving excrement from the refuse bowl 214.

The refuse bowl 214 is seated in the depression 212 and holds excrement therein during defecation and urination, and discharges the excrement into the discharge port of the depression 212 after defecation and urination. To achieve the above-mentioned function of the refuse bowl 214, the refuse bowl 214 is provided with a rotating device, which includes a rotating shaft 214a laterally passing through the refuse bowl 214 such that the opposite ends of the shaft 214a protrude outside the opposite side walls of the refuse bowl 214, and a rotating handle 214b mounted to each of the opposite ends of the rotating shaft 214a protruding outside the toilet bowl 211.

When a user rotates the rotating handle 214b by hand at a predetermined angle after defecation and urination, the refuse bowl 214 is rotated around the rotating shaft 214a at the same angle, thus becoming tilted at the predetermined angle. Thus, the excrement can be discharged from the refuse bowl 214 to a septic tank through the refuse pipe 213 without flushing with water.

Here, if the refuse bowl 214 does not have the hemispherical shape, the longitudinal width of the refuse bowl 214 may be different from the lateral width thereof, so that the refuse bowl 214 may not be rotated in the hemispherical depression 212. Thus, even in the case where the refuse bowl 214 does not have the hemispherical shape, the refuse bowl 214 is configured such that the bottom surface thereof avoids close contact with the depression 212, but a predetermined gap remains between the bowl 214 and the depression 212, thus allowing the bowl 214 to be easily rotated in the depression 212.

Further, as shown in FIG. 4, the refuse bowl 214 may have a rounded bottom bowl shape having a lip 214c, instead of the hemispherical shape. The refuse bowl 214 having the rounded bottom bowl shape may discharge the excrement more easily when it is rotated.

Further, the refuse bowl 214 is preferably made of anticorrosive material, such as stainless steel, so that the bowl 214 can be prevented from corroding by the high humidity in the toilet or by water supplied from a toilet tank 215, as will be described later herein.

Further, the refuse bowl 214 preferably has a coating on the surface thereof so as to prevent the excrement from sticking thereto, thus maintaining the cleanliness of the surface.

The toilet tank 215 supplies water to the refuse bowl 214, thus more easily discharging the excrement when the excrement is discharged from the rotated refuse bowl 214 and reducing the emission of odors. To achieve the above-mentioned object, a water supply pipe 215b, which passes through the toilet bowl 211, is connected at opposite ends thereof both to the toilet tank 215 and to the refuse bowl 214, so that, when a user manipulates a flush handle 215a of the toilet tank 215, water is supplied from the toilet tank 215 to the refuse bowl 214.

In the above state, the toilet tank 215 may use a tank having a capacity smaller than that of a conventional toilet tank, or may use another tank, which has a capacity almost equal to that of the conventional tank, but is configured to supply water several times without being refilled. Unlike the conventional toilet, which is configured to discharge the excrement with water using a water pressure difference and requires about 13 liters or 14 liters of water to flush the toilet, the present invention is configured to manually rotate the refuse bowl 214 and discharge the excrement with water, so that the toilet of the present invention can efficiently discharge the excrement using 1 liter or 2 liters of water.

Further, the toilet 210 according to the present invention may be provided with a bidet device on the side of the toilet bowl 211, thus allowing a user to feel comfort during defecation or urination. The bidet device is well known to those skilled in the art and further explanation is thus deemed unnecessary.

Hereinbelow, the cyclone-type sewage purifier for treating the excrement discharged from the toilet according to the present invention will be described in detail with reference to the accompanying drawings.

In the following description, the cyclone-type sewage purifier of the present invention will be described with reference to an embodiment used in a multi-family building, in which multiple families dwell.

Figure 5:
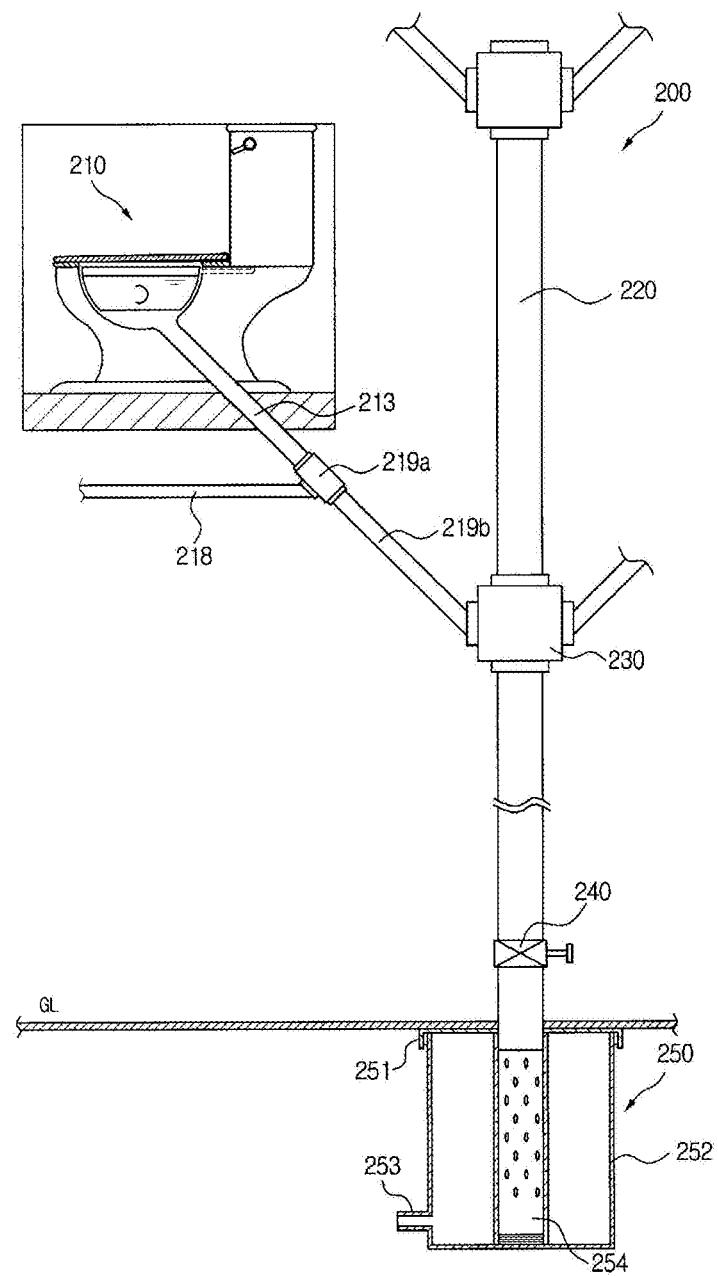
FIG. 5 is a view illustrating the construction of the toilet and a cyclone-type sewage purifier according to the present invention.
Figure 6:
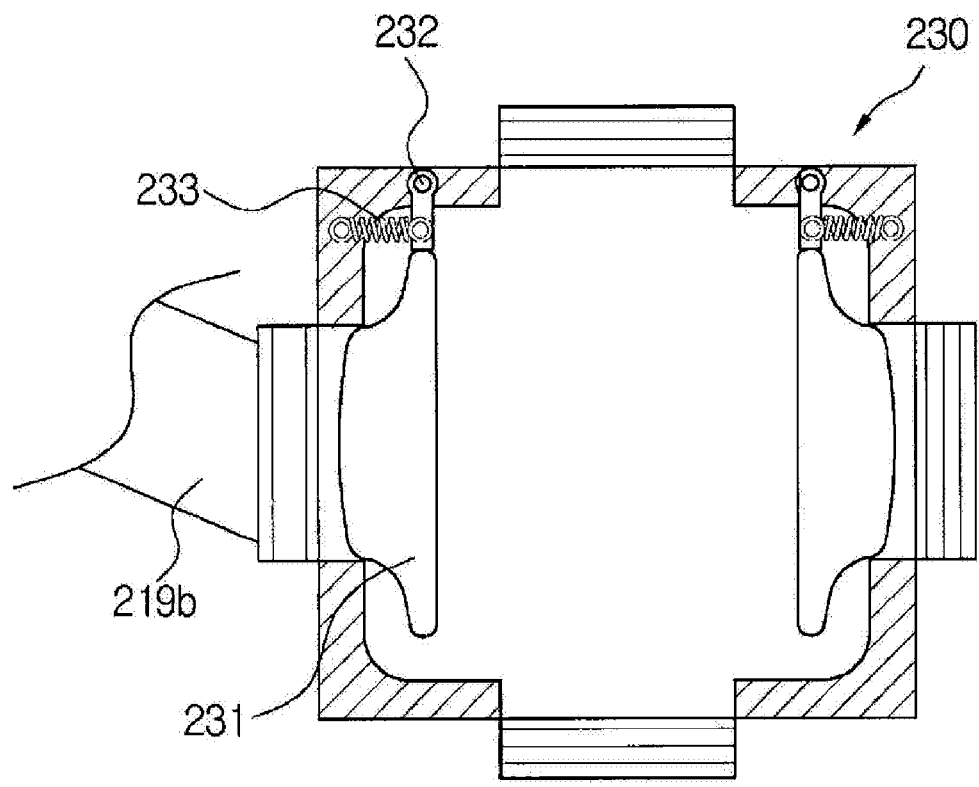
FIG. 6 is a view illustrating the construction of an odor trap of the cyclone-type sewage purifier according to the present invention.

FIG. 5 is a view illustrating the construction of the toilet and the cyclone-type sewage purifier according to the present invention. FIG. 6 is a view illustrating the construction of an odor trap of the cyclone-type sewage purifier according to the present invention.

First, as shown in FIG. 5, the cyclone-type sewage purifier according to the present invention is configured such that the refuse pipes 213 extending from the toilets 210 of respective families and the waste water pipes 218 for waste water, generated by washing, bathing and cleaning activities of the respective families, are joined to a single integration pipe 220, and the excrement and waste water are discharged to a cyclone tub 250 through the integration pipe 220.

Described in detail, unlike a conventional technique, in which the refuse pipes 213 are connected to an excrement treatment tank and the waste water pipes 218, separated from the refuse pipes 213, are connected to a waste water tank without using such an integration pipe 220, the cyclone-type sewage purifier according to the present invention is configured such that the refuse pipes 213 and the waste water pipes 218 are joined to the integration pipe 220, thereby discharging the excrement and the waste water at the same time and utilizing the waste water for discharging the excrement.

To achieve the above-mentioned object, as shown in FIG. 5, the refuse pipe 213, extending from a toilet 210, and the waste water pipe 218 are connected to the inlet end of a T-shaped pipe joint 219a, and the outlet end of the T-shaped pipe joint 219a is connected to the first end of a connection pipe 219b. The second end of the connection pipe 219b is connected to the integration pipe 220, so that the excrement discharged through the refuse pipe 213 and the waste water discharged through the waste water pipe 218 are mixed together and discharged to the cyclone tub 250 through the integration pipe 220.

In the above description, after the refuse pipe 213 and the waste water pipe 218 are connected to the connection pipe 219b using the T-shaped pipe joint 219a, the connection pipe 219b is connected to the integration pipe 220 using a cross pipe joint 230. However, the above-mentioned sequence of the pipe coupling process is because the cyclone-type sewage purifier of the present invention is embodied as a purifier used in a multi-family building, in which multiple families dwell. Thus, if the cyclone-type sewage purifier of the present invention is embodied as a purifier used in a single family building, in which a single family dwells, the connection pipe 219b, which is connected both to the refuse pipe 213 and to the waste water pipe 218 using the T-shaped pipe joint 219a, functions as the integration pipe 220 and discharges the excrement and the waste water, as is well known to those skilled in the art.

The cyclone tub 250 is installed inside a housing 252, which is fixed to an upper cover 251 placed below the ground line (GL) and has an outlet port 253 at a predetermined location on a lower portion thereof for discharging the treated excrement and waste water to the outside. Thus, the cyclone tub 250 can purify the excrement using a vortex generated when the mixed excrement and waste water, discharged from the integration pipe 220, is dropped into the tub 250. The construction and operation of the cyclone tub 250 will be described in detail hereinbelow with reference to FIG. 7.

Here, as shown in FIG. 6, to prevent odors from the excrement and the waste water from flowing backwards to the respective residences, a trap valve is preferably installed in the cross pipe joint 230 which connects the connection pipe 219b to the integration pipe 220. The trap valve comprises a rubber packing 231, which has a shape suitable for closing each coupling port of the cross pipe joint 230, a connector 232 connected to the rubber packing 231 at the first end thereof and to the cross pipe joint 230 at the second end, and an elastic member 233, which elastically biases the rubber packing 231 using the spring force thereof to close the coupling port of the cross pipe joint 230 when no excrement or waste water is discharged from the connection pipe 219b, but allows the rubber packing 231 to be retracted to open the coupling port when excrement or waste water is discharged from the connection pipe 219b.

Further, a butterfly valve 240 is mounted on the integration pipe 220 so as to close the integration pipe 220 during work for inspecting the cyclone tub 250. The butterfly valve 240 is configured to open or close the integration pipe 220 by rotating a control knob provided on a side surface thereof. The construction and function of the butterfly valve 240 is well known to those skilled in the art and further explanation is thus deemed unnecessary.

Hereinbelow, the construction and operation of the cyclone tub, included in the cyclone-type sewage purifier according to the present invention and used for treating the excrement and waste water, will be described in detail.

Figure 7:
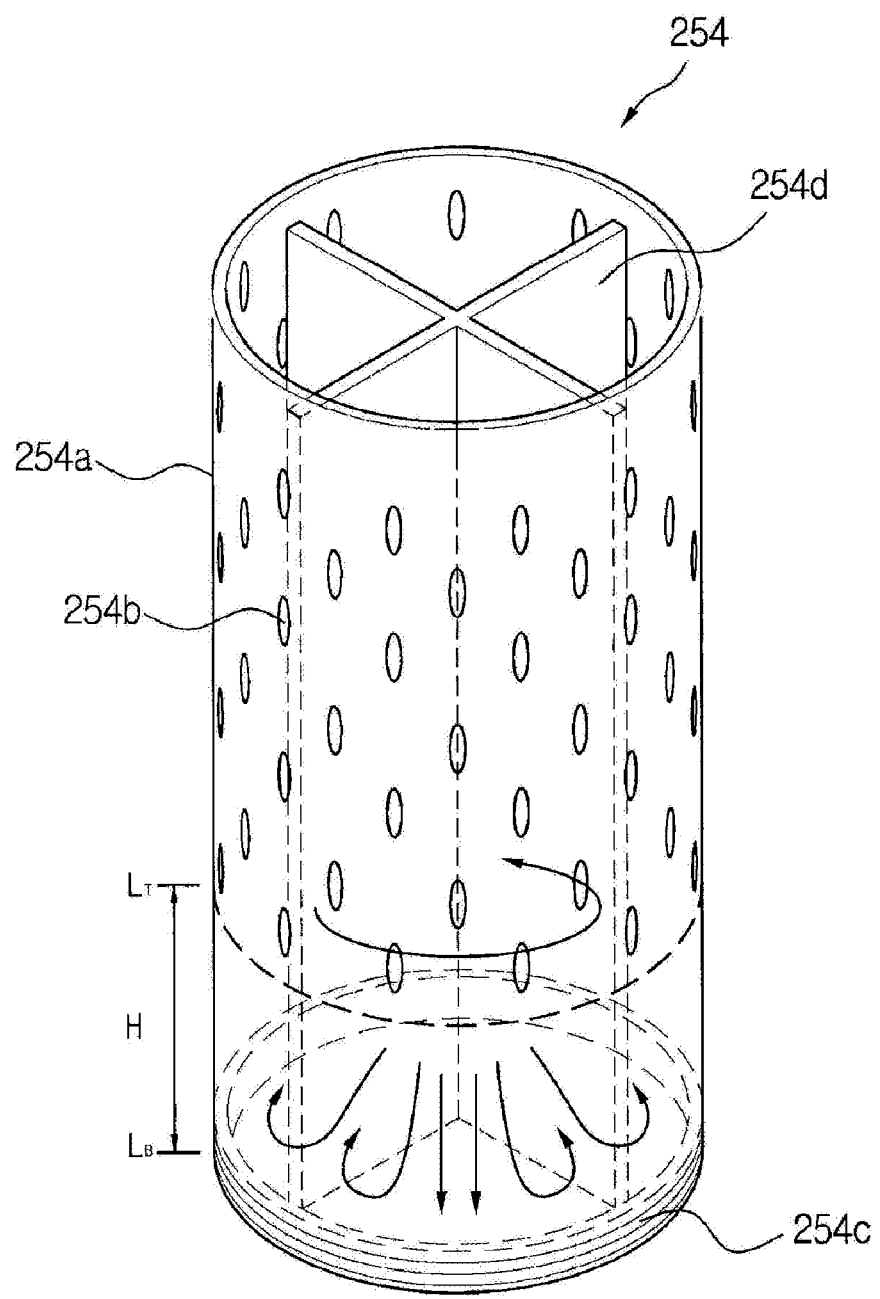
FIG. 7 is a perspective view illustrating the construction of a cyclone tub of the cyclone-type sewage purifier according to the present invention.
Figure 8:
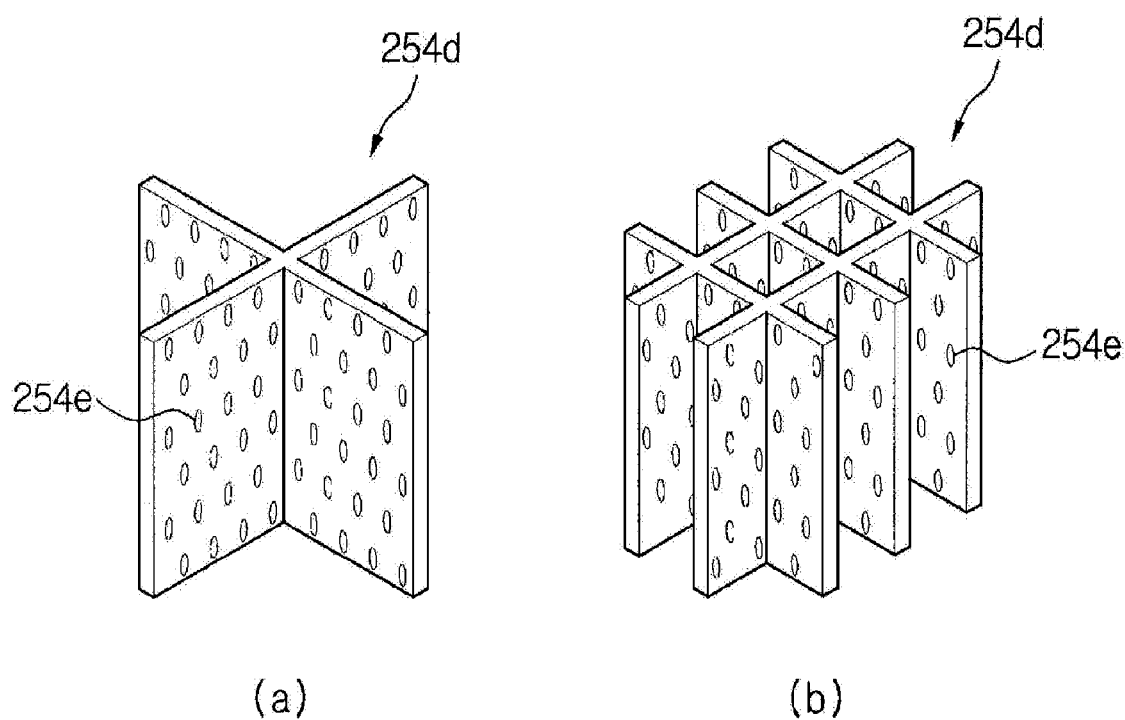
FIG. 8 is a perspective view illustrating the appearance of a crushing fan of the cyclone-type sewage purifier according to the present invention.
Figure 9:
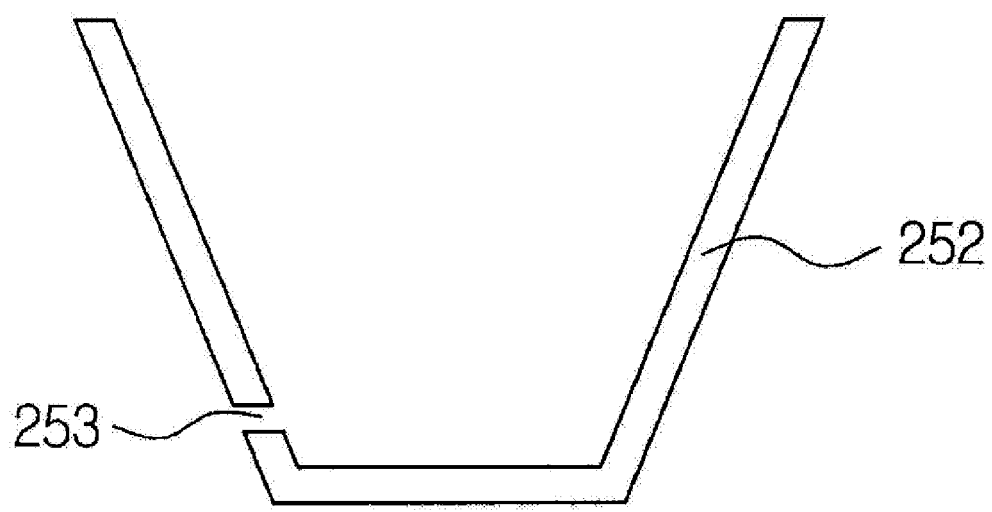
FIG. 9 is a sectional view a housing of the cyclone-type sewage purifier according to the present invention.

FIG. 7 is a perspective view illustrating the construction of the cyclone tub of the cyclone-type sewage purifier according to the present invention. FIG. 8 is a perspective view illustrating the appearance of a crushing fan of the cyclone-type sewage purifier according to the present invention. FIG. 9 is a sectional view of the housing of the cyclone-type sewage purifier according to the present invention.

The cyclone tub 250 shown in FIG. 7 is coupled to the lower end of the integration pipe 220, from which the excrement and the waste water are discharged. Here, the cyclone tub 250 is installed in the housing 252, which is mounted to the upper cover 251 fixedly installed below the ground line (GL) and has the outlet port 253 at a predetermined location on the lower portion thereof for discharging the treated excrement and waste water to the outside.

Here, the cyclone tub 250 generates a vortex and air bubbles in the excrement and waste water discharged and descending from the integration pipe 220, thus dissolving the excrement and purifying the excrement with the waste water. The cyclone tub 250 comprises a crushing fan 254d installed inside a tub body 254a so as to crush the descending excrement, a plurality of perforations 254b formed in the sidewall of the tub body 254a so as to discharge the treated excrement, and a shock absorbing plate 254c placed on the bottom of the tub body 254a so as to absorb shocks generated from the descending excrement and waste water.

In the present invention, the crushing fan 254d may comprise two crushing plates crossing each other, as shown in FIG. 8(a), or may comprise five crushing plates crossing each other in an effort to improve the excrement crushing function, as shown in FIG. 8(b).

Further, each blade of the crushing fan 254d is provided with a plurality of vortex holes 254e for allowing the vortexes to be easily generated between the regions partitioned by the blades of the crushing fan 254d. Further, the surface area of each of the vortex holes 254e formed in the crushing fan 254d is preferably determined to be smaller than that of the perforations 254b formed in the sidewall of the cyclone tub 250, thus generating a difference of flowing speed between the excrement and the waste water and thereby generating stronger vortexes in the cyclone tub 250.

Further, the cyclone tub 250 is normally filled with a predetermined amount of water or with water to a predetermined water level H, thus easily generating a vortex therein, and absorbs and reduces the shock from the descending excrement and waste water, so that it is possible to prevent malfunctioning of the cyclone tub 250 installed below the ground line (GL).

The cyclone tub 250 is operated as follows. The descending excrement collides with the crushing fan 254d, thus being primarily crushed and stacked on the bottom surface of the tub 250. Here, the shock absorbing plate 254c is installed on the bottom surface of the tub 250 and waste water is contained in the tub 250 to a predetermined level H, so that the shock from the descending excrement can be absorbed and reduced. Further, waste water from respective families or the mixture of the excrement and waste water is continuously dropped onto and collides on the crushed excrement stacked on the bottom surface of the tub 250, thus generating the vortex and air bubbles in the waste water and thereby almost completely dissolving the excrement. The pulverized excrement mixed in the waste water is discharged from the cyclone tub 250 through the perforations 254b, which are formed in the sidewall of the tub 250 at locations above the highest water level LT. The discharged excrement may be fed to an excrement treatment tank and purified therein.

In other words, the excrement and the waste water are discharged through a single integration pipe 220 of the present invention, so that the waste water can be used for dissolving the excrement. Thus, the present invention sanitarily treats the excrement and reduces the consumption of water resources.

In the above description, an embodiment of the toilet using the cyclone-type sewage purifier according to the present invention has been described. However, it should be understood that the above-mentioned construction of the present invention may be variously embodied by those skilled in the art without departing from the scope and spirit of the invention.

Particularly, in the above description of the present invention, both the excrement and the waste water are discharged through a single integration pipe 220, to which the refuse pipe and the waste water pipe are integrated. Further, a cyclone tub 250 is mounted to the lower end of the integration pipe 220. However, it is well known to those skilled in that art that the present invention may be configured such that, in a manner similar to that of the conventional technique, the refuse pipe 120 and the waste water pipe 140 can be separately used, and a single cyclone tub 250, capable of receiving therein both the refuse pipe 120 and the waste water pipe 140 at the same time, is mounted to the lower ends of both the refuse pipe 120 and the waste water pipe 140 such that the excrement and the waste water are discharged to the cyclone tub 250 from the refuse pipe 120 and the waste water pipe 140 so as to purify the excrement using a vortex, without being limited to the above-mentioned embodiments.

Although the embodiments of the water purifying apparatus using cyclones according to the present invention have been described for illustrative purposes, those skilled in the art will appreciate that various modifications, additions and substitutions are possible, without departing from the scope and spirit of the invention as disclosed in the accompanying claims.

As described above, the present invention provides a toilet using a cyclone-type sewage purifier. The toilet can discharge excrement using a small amount of water, thus reducing the consumption of water for flushing the toilet, and can sanitarily treat the discharged excrement using waste water.

What is claimed is:

1. A toilet using a cyclone sewage purifier, comprising:
 a toilet bowl including a depression defining a space having a predetermined shape;
 a refuse pipe provided in the toilet bowl such that the refuse pipe passes through the toilet bowl and is connected at a first end thereof to the depression, thus guiding discharge of excrement from the depression to an outside of the toilet bowl;
 a waste water pipe for discharge of waste water;
 a refuse bowl seated in the depression and temporarily holding the excrement during defecation and urination, and discharging the excrement into the refuse pipe when the refuse bowl is rotated;
 a rotating device for rotating the refuse bowl and discharging the excrement from the refuse bowl into the refuse pipe; and
 a cyclone sewage purifier for executing purification treatment, comprising:
 a housing having an outlet port in a lower portion thereof at a predetermined location and discharging treated excrement and waste water from the refuse pipe and the waste water pipe to the outside through the outlet port; and
 a cyclone tub placed inside the housing and generating a vortex using the descending excrement and waste water, wherein the cyclone tub is provided with a plurality of perforations in a sidewall thereof, and the cyclone tub is provided therein with a crushing fan for crushing the descending excrement.

2. The toilet using the cyclone sewage purifier according to claim 1, further comprising: a toilet tank connected to the refuse bowl through a water supply pipe so as to supply water to the refuse bowl.

3. The toilet using the cyclone sewage purifier according to claim 2, wherein the refuse bowl has a rounded bottom bowl shape having a lip.

4. The toilet using the cyclone sewage purifier according to claim 3, wherein the first end of the refuse pipe, connected to the depression, has a flaring shape.

5. The toilet using the cyclone sewage purifier according to claim 4, wherein the refuse bowl is made of stainless steel and has a coating on a surface thereof so as to prevent the excrement from sticking thereto.

6. The toilet using the cyclone sewage purifier according to claim 5, wherein the toilet bowl is provided with a bidet device.

7. The toilet using the cyclone sewage purifier according to claim 1, wherein the refuse bowl has a rounded bottom bowl shape having a lip.

8. The toilet using the cyclone sewage purifier according to claim 7, wherein the first end of the refuse pipe, connected to the depression, has a flaring shape.

9. The toilet using the cyclone sewage purifier according to claim 8, wherein the refuse bowl is made of stainless steel and has a coating on a surface thereof so as to prevent the excrement from sticking thereto.

10. The toilet using the cyclone sewage purifier according to claim 9, wherein the toilet bowl is provided with a bidet device.

11. The toilet using the cyclone sewage purifier according to claim 1, wherein the toilet is a flushing toilet.

12. The toilet using the cyclone sewage purifier according to claim 1, wherein the refuse pipe for discharging the excrement and the waste water pipe for discharging the waste water are connected to a single integration pipe such that the excrement and the waste water can be mixed together and discharged to the cyclone tub through the integration pipe.

13. The toilet using the cyclone sewage purifier according to claim 1, wherein the housing has a tapered cup shape an upper end of which has a diameter larger than that of a lower end thereof.

14. The toilet using the cyclone sewage purifier according to claim 1, wherein the cyclone tub is provided with a shock absorbing plate on a bottom thereof for absorbing shock from the descending excrement and waste water.

15. The toilet using the cyclone sewage purifier according to claim 1, wherein the crushing fan has blades.

16. The toilet using the cyclone sewage purifier according to claim 15, wherein the crushing fan is provided with a plurality of vortex holes in each of the blades thereof.

17. The toilet using the cyclone sewage purifier according to claim 16, wherein each of the vortex holes formed in the crushing fan has a surface area smaller than that of each of the perforations formed in the sidewall of the cyclone tub.

\* \* \* \* \*